United States Patent [19]
Sakaki et al.

[11] Patent Number: 5,648,164
[45] Date of Patent: Jul. 15, 1997

[54] RECORDING PAPER AND INK-JET RECORDING PROCESS MAKING USE OF THE SAME

[75] Inventors: Mamoru Sakaki, Yamato; Masato Katayama, Yokohama, both of Japan

[73] Assignee: Canon Kabushiki Kaisha, Tokyo, Japan

[21] Appl. No.: 183,808

[22] Filed: Jan. 21, 1994

[30] Foreign Application Priority Data

Jan. 25, 1993 [JP] Japan ................................. 5-010001

[51] Int. Cl.$^6$ ..................................... B32B 29/00
[52] U.S. Cl. .................. 428/341; 428/195; 428/342; 428/409; 428/452; 428/478.8; 428/486; 428/507; 428/521; 428/537.5; 428/688
[58] Field of Search ..................... 428/195, 211, 428/535, 537.5, 409, 411.1, 478.8, 496, 507, 511, 341, 342, 452, 521, 688; 346/135.1; 162/135, 164.4

[56] References Cited

U.S. PATENT DOCUMENTS

| | | | |
|---|---|---|---|
| 4,758,461 | 7/1988 | Akiya et al. | 428/212 |
| 5,053,495 | 10/1991 | Greenwood et al. | 534/829 |
| 5,126,010 | 6/1992 | Kobayashi et al. | 162/135 |
| 5,180,624 | 1/1993 | Kojima et al. | 428/211 |
| 5,302,249 | 4/1994 | Malhotra et al. | 162/135 |
| 5,302,437 | 4/1994 | Idei et al. | 428/195 |
| 5,364,702 | 11/1994 | Idei et al. | 428/423.1 |

FOREIGN PATENT DOCUMENTS

| | | |
|---|---|---|
| 0028720 | 5/1981 | European Pat. Off. . |
| 0379978 | 8/1990 | European Pat. Off. . |
| 51-13244 | 2/1976 | Japan . |
| 54-059936 | 5/1979 | Japan . |
| 59-35977 | 2/1984 | Japan . |
| 59-162561 | 9/1984 | Japan . |
| 1-135682 | 5/1989 | Japan . |
| 2211866 | 7/1989 | United Kingdom . |

*Primary Examiner*—William Krynski
*Attorney, Agent, or Firm*—Fitzpatrick, Cella, Harper & Scinto

[57] ABSTRACT

Disclosed herein is recording paper suitable for use in recording making use of a water-based recording liquid containing a dye which varies from water-soluble to water-insoluble according to the change of pH, wherein the recording paper is neutral or alkaline, and the surface pH of the paper is adjusted to a value not higher than the pH at which the dye turns water-insoluble.

13 Claims, No Drawings

RECORDING PAPER AND INK-JET RECORDING PROCESS MAKING USE OF THE SAME

BACKGROUND OF THE INVENTION

1. Field of the Invention

The present invention relates to an ink-jet recording process making use of so-called plain paper to which a special coating is not applied, and particularly to recording paper comprising neutral or alkaline paper with an excellent long-term shelf stability and permitting the formation of clear images and an ink-jet recording process making use of such recording paper.

The present invention also relates to recording paper permitting the formation of images excellent in water resistance and an ink-jet recording process making use of such recording paper.

This invention further relates to an ink-jet recording process making use of widely-usable recording paper which exhibits excellent properties even as toner-transfer paper suitable for use in electrophotographic recording systems and permits the formation of clear images even in ink-jet recording.

The term "neutral or alkaline paper" used in the present invention means a paper which is made so as to make the water extracted pH not less than 6 and without using aluminum sulfate as possible.

2. Related Background Art

Ink-jet recording systems have attracted attention because of ready attainment of high-speed, high-density and full-color recording. Such exclusive coated paper sheets as disclosed in, for example, Japanese Patent Application Laid-Open Nos. 59-35977 and 1-135682 have been used in such ink-jet recording systems.

Meanwhile, in the fields of black-and-white recording and business color recording, there has been demand for development of recording paper low in price and widely usable, in particular, recording paper usable in common as toner-transfer paper (paper for PPC) for copying machines and the like making use of an electrophotographic recording system, which are in common use in offices at present.

Problems involved in ink-jet recording making use of paper for PPC are the following two points:

(1) ink absorptivity is poor, so that when a great amount of an ink is applied to the paper, the drying and fixing of the ink are delayed (if an object comes into contact with a recording surface in the state that the ink is neither fixed nor dried, the image formed is impaired); and (2) an ink spreads along fibers of the paper at the time the ink is absorbed in a paper layer, so that feathering of dots occurs to a great extent, and the peripheries of the dots hence become jagged and blurred, resulting in failure of the provision of clear characters and images.

A further problem involved in the ink-jet recording making use of the paper for PPC is that images formed are poor in water resistance, so that they run out and become illegible when they come into contact with waterdrops, or get wet with water.

Water-based inks comprising an aqueous solvent and a water-soluble dye have heretofore been used in ink-jet recording systems. Therefore, the use of a hardly water-soluble dye for the purpose of improving the water resistance of the resulting images offers problems that clogging due to deposition of the dye on the tip of a nozzle of an ink-jet recording head tends to occur, and the dye in the ink aggregates and precipitates if the ink is not used for a long period of time.

As a method for solving these contrary problems to each other, may be mentioned a method wherein a dye which is present in the form of a water-soluble salt (for example, ammonium salt) in an ink, but insolubilized (for example, counter ions being substituted by $H^+$ ions by deammoniation to form an insoluble matter) on the surface of paper applied is used.

Examples of such dyes include ammonium salts of dyes disclosed in, for example, U.S. Pat. No. 5,053,495.

Meanwhile, in recent years, occasions to use neutral or alkaline paper in place of the conventional acid paper have increased due to problems of the shelf stability of paper and the like. Neutral or alkaline toner-transfer paper sheets excellent in electrophotographic recordability are disclosed in Japanese Patent Application Laid-Open Nos. 51-13244 and 59-162561.

Recording on neutral or alkaline paper for PPC making use of the above-described water-resistant dye offers a further problem that sufficient water resistance can not be imparted to the resulting image compared with the case of the conventional acid paper.

As described above, there has not yet been obtained under the circumstances any ink-jet recording process which permits the formation of images clear and excellent in water resistance on all the paper sheets for PPC including neutral or alkaline paper.

SUMMARY OF THE INVENTION

It is therefore an object of the present invention to provide recording paper which is excellent in ability to fix and dry inks, gives adequate and even spreading to dots and hence permits the formation of clear characters and images, and particularly can provide images excellent in water resistance.

Another object of the present invention is to provide an ink-jet recording process making use of recording paper usable in both electrophotographic recording and ink-jet recording, in particular, neutral or alkaline paper, said process being suitable for use in black-and-white recording and business color recording.

Such objects can be achieved by the present invention described below.

According to the present invention, there is thus provided recording paper suitable for use in recording making use of a water-based recording liquid containing a dye which varies from water-soluble to water-insoluble according to the change of pH, wherein the recording paper is neutral or alkaline, and the surface pH of the paper is adjusted to a value not higher than the pH at which the dye turns water-insoluble.

According to the present invention, there is also provided an ink-jet recording process comprising applying droplets of a water-based ink containing a dye, which varies from water-soluble to water-insoluble according to the change of pH, to recording paper to conduct recording, wherein the recording paper is neutral or alkaline, the surface pH of the paper is adjusted to a value not higher than the pH at which the dye turns water-insoluble, and the dye is insolubilized on the surface of the recording paper.

DESCRIPTION OF THE PREFERRED EMBODIMENTS

The present invention will hereinafter be described in more detail by the preferred embodiments of this invention.

The first feature of the present invention is to use a dye having such particular properties as described below in ink-jet recording process making use of an ink comprising mainly water as a solvent.

A dye used in the process of the present invention is an acid or direct dye, exists in the form of a salt of a cation such as an alkali metal ion or ammonium ion in an ink, is soluble in water and has properties that the cation as a counter ion is eliminated from the dye in the course of the application of the ink to recording paper, the evaporation of a solvent and then the penetration into a paper layer to be substituted by an $H^+$ ion, thereby turning water-insoluble, whereby the dye combines excellent solubility in ink with good water resistance upon formation of images, said properties being contrary to each other.

According to the results of an investigation conducted by the present inventors, it has however been found that the use of such a dye as described above does not always exhibit sufficient water resistance on all kinds of paper.

The above-described dye imparts sufficient water resistance to images on acid paper, but does not do so on neutral or alkaline paper.

This indicates that the elimination of the cation and the substitution of the $H^+$ ion greatly depend on the physical properties of paper.

The present inventors have found that if the surface pH of recording paper on which recording is conducted with an ink is not higher than the pH at which the cation is eliminated from the dye to be substituted by an $H^+$ ion (i.e., the pH at which the dye varies from water-soluble to water-insoluble), the insolubilization of the dye on the paper surface is allowed to progress with ease, whereby an image having sufficient water resistance can be obtained, thus leading to completion of the present invention.

The term "the pH at which the insolubilization of dye takes place" used in the present invention means a pH value at which decreasing of the solubility of dye occurs when the solubility of dye in an ink or in water to a pH value is plotted continuously.

More specifically, the pH at which the insolubilization of the dye takes place is near neutrality from the viewpoint of mechanism. Therefore, in the case of acid paper, sufficient water resistance is manifested because its pH (water extracted pH prescribed by JIS-P-8133; pH of the whole paper) is not higher than 5. In the case of neutral or alkaline paper, however, sufficient water resistance is not manifested because its pH (water extracted pH) is generally not lower than 6 judging from the nature of materials making up the paper, particularly, not lower than 7 in the case where an alkylketene dimer or alkenylsuccinic anhydride which is a common neutral or alkaline size is used.

According to the recording process of the present invention, the pH of the recording surface of the paper is adjusted to a value not higher than the pH at which the above-described dye is insolubilized. Therefore, even if neutral or alkaline paper having a water extracted pH not lower than 6 or not lower than 7 is used, images having sufficient water resistance can be formed by combination with such a dye.

The term "the surface pH" of the paper as used in the process of the present invention means the surface pH of paper prescribed by Japan Technical Association of the Pulp and Paper Industry (J'TAPPI).

The recording paper used in the present invention is made by using chemical pulp typified by LBKP, NBKP and/or the like, a size and a filler as main components, and optionally other auxiliaries for paper making in accordance with the method known per se in the art. As the pulp material to be used, mechanical pulp and/or regenerated pulp from waste paper may be used in combination with the chemical pulp. Alternatively, they may be used as a main component.

Examples of the size include rosin sizes, alkylketene dimers, alkenylsuccinic anhydrides, petroleum resin sizes, epichlorohydrin, cationic starch, acrylamide and the like. The recording paper used in the recording process of the present invention is adjusted to a water extraction pH of 6 or higher, preferably 7 or higher.

If the Stöckigt sizing degree of the recording paper thus adjusted is too low, ink droplets applied to such paper spread to a too great extent, and difficulties are hence encountered on the formation of clear images and characters. On the contrary, if the sizing degree is too high, an ink applied to such paper is not absorbed in the paper layer long afterward, so that the ability to fix and dry the ink applied is deteriorated. It is hence preferable that the Stöckigt sizing degree be within a range of from 16 to 40 seconds.

In the present invention, it is further preferable that the recording surface of the recording paper formed in the above-described manner should contain a penetration-preventing (retarding) agent for recording liquids. The penetration of the recording liquid applied to the recording surface of the recording paper according to the present invention into the paper layer is slowed down by about 0.01 second to several seconds owing to the action of the penetration-preventing agent. In the meantime, most of a low-boiling solvent such as water is evaporated on the surface of the paper, and the recording liquid is then caused to penetrate into the paper layer.

Owing to this effect, the recording liquid does not spread to a greater degree than the recording needs. In addition, the dye remains near the recording surface, so that dots high in contrast are formed.

Preferred materials for the penetration-preventing agent include casein, starch, cellulose derivatives such as carboxymethyl cellulose and hydroxyethyl cellulose, hydrophilic resins swellable in inks, such as polyvinyl alcohol, polyvinyl pyrrolidone, sodium polyacrylate and polyacrylamide, SBR latices, acrylic emulsions, resins having a hydrophilic moiety and a hydrophobic moiety in their molecules, such as styrene/maleic acid copolymers and styrene/acrylic acid copolymers, substances having water repellency, such as silicone oil, paraffin wax and fluorine compounds, the above-described sizes, and the like.

These materials are applied to the recording surface in a proportion of about 0.1 to 3 $g/m^2$.

The recording paper retains the penetration-preventing effect so long as such materials are contained within the above range. In addition, the remaining recording liquid which is a residue after evaporation including the nonvolatile solvent penetrates into the paper layer to be absorbed therein, so that the ink-fixing ability is not lowered to an extreme extent.

In the process of the present invention, the surface pH of the recording paper may be adjusted by substances to be added upon papermaking. However, it is more effective to adjust the surface pH by selecting, as the penetration-preventing agent, a material which adjusts the surface pH of the recording paper to a value not higher than the pH at which the dye turns water-insoluble, or adding a pH adjustor as an additive to a coating formulation of the penetration-preventing agent.

Preferred pH adjustors include organic hydrogen carboxylates such as sodium hydrogen phthalate and potassium hydrogen phthalate and besides, hydrogen phosphates, hydrogen carbonates, etc.

Further, since the recording paper according to the present invention does not greatly differ from the conventional paper for PPC in surface profile and physical properties, it may be applied to both toner-transfer paper for electrophotographic recording and ink-jet recording paper.

The inks used in the ink-jet recording process according to the present invention are conventionally-known inks comprising water as a main component and containing an organic solvent such as a polyhydric alcohol, a dye as a recording agent and other additives.

Although the properties of the dyes used in the present invention have already been described, all dyes to be used in the case of color recording are not necessarily those used in the process of this invention so long as at least one of the dyes according to the present invention is in use. Others may be any conventionally-known dyes other than those used in the process of this invention.

In the process of the present invention, it is preferable that the dye used in the process of the present invention is included at least as a black dye. As examples of such a preferred dye, may be mentioned those represented by the following structural formula (I):

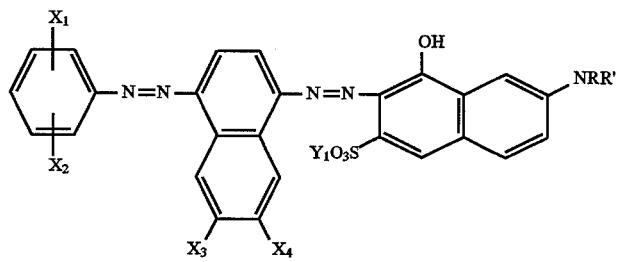

(I)

wherein $X_1$ is $COOY_1$, $X_2$ is H, $COOY_2$, $SO_3Y_3$, halogen, nitro group, cyano group, alkyl group, alkoxy group or acrylamino group, $X_3$ and $X_4$ are individually H, $COOY_4$ or $SO_3Y_5$, R and R' are individually H, alkyl group or $COOR^2$ where $R^2$ is H or alkyl group, and $Y_1$ through $Y_5$ are individually Na, Li, K, $NH_4$ or H.

Ink-jet recording systems to which the process of the present invention can be applied may include any conventionally-known ink-jet recording systems in which minute droplets of an ink are ejected from a nozzle by using various principles of drive to conduct recording.

Among others, the present invention may be particularly effectively used in an ink-jet recording system according to the method described in Japanese Patent Application Laid-Open No. 54-59936, in which an ink undergoes a rapid volumetric change by an action of thermal energy applied to the ink, so that the ink is ejected through a nozzle by the working force generated by this change of state.

The present invention will hereinafter be described in more detail by the following examples.

Preparation of Recording Paper

A recording base paper web having a basis weight of 70 g/m² was made in accordance with the method known per se in the art by mixing 90 parts of LBKP and 10 parts of NBKP as raw pulp, beating the mixture and then incorporating 10 parts of calcium carbonate (Escalon, product of Sankyo Seifun K.K.), 0.2 part of neutral rosin size (Sizepine NT, product of Arakawa Chemical Industries, Ltd.) and 0.5 part of cationic starch into the mixture.

A 2% aqueous solution of oxidized starch (MS-3800, product of Nihon Shokuhin Kako Co., Ltd.) was prepared to apply it to this base paper web at a rate of 1 g/m² by an air spray coater, thereby preparing Recording Paper A1. The surface pH of Recording Paper A1 was measured by means of a pH meter for measurement of paper surface (manufactured by Kyoritsu Rikagaku Kenkyusho) and was found to be 7.6.

Aqueous solutions of potassium hydrogen phthalate as a pH adjustor were separately added to the aqueous solution of oxidized starch to apply each of the mixed solutions to the same base paper web as that used above in the same manner as described above, thereby preparing Recording Paper A2 and Recording Paper A3 having surface pHs of 7.3 and 6.8, respectively.

A base paper web was made in the same manner as in the preparation of Recording Paper A1 except that the neutral rosin size and calcium carbonate in the making of the base paper web of Recording Paper A1 were changed to an alkylketene dimer and kaolin (product of Tsuchiya Kaolin Ind., Ltd.), respectively, and the same aqueous solution of oxidized starch as that used in Recording Paper A1 was applied to the thus-made base paper web, thereby preparing Recording Paper B1 having a surface pH of 7.8.

Recording Paper B2 and Recording Paper B3 having surface pHs of 7.4 and 7.0, respectively, were prepared in the same manner as in the preparation of Recording Paper A1 except that potassium hydrogen phosphate as a pH adjustor was added to the aqueous solution of oxidized starch.

Recording Paper C1 was prepared in the same manner as in the preparation of Recording Paper A1 except that the neutral rosin size in the making of the base paper web of Recording Paper A1 was changed to alkenylsuccinic anhydride. The surface pH of Recording Paper C1 was 8.2.

An aqueous solution of aluminum sulfate was applied to the surface of Recording Paper C1 by an air spray coater to adjust the surface pH of Recording Paper C1, thereby preparing Recording Paper C2 and Recording Paper C3 having surface pHs of 7.1 and 6.3, respectively.

| (Ink composition) | |
|---|---|
| Dye | 3 parts |
| Triethylene glycol | 5 parts |
| Isopropyl alcohol | 5 parts |
| Urea | 5 parts |
| Water | 82 parts |

Ink a:

A dye of the above-described structural formula (I), wherein $X_1$ is 5-$COONH_4$, $X_2$ is 3-$COONH_4$, $X_3$ and $X_4$ are individually H, $Y_1$ is $NH_4$, and R and R' are individually H, was used.

Diluted hydrochloric acid was added dropwise to an aqueous solution of the above dye with stirring to lower the pH of the aqueous solution. As a result, the dye deposited at the point where the pH reached 7.5.

Ink b:

C.I. Food Black 2 was used as a dye.

Using recording paper and ink according to their corresponding combinations shown in the following Table 1, recording was conducted by a recording apparatus equipped with a recording head of the above-described ink-jet system that an ink is ejected by thermal energy, said head having recording nozzles in a proportion of 14 nozzles per mm, thereby evaluating recordability.

Evaluation Items

(1) Print Quality

A straight line having a width of 1 dot was printed in parallel with the scanning direction of the head to visually observe it 25 cm apart from the line, thereby evaluating the print quality.

The print quality was ranked as B where the edge portions of the straight line were dim or blurred, and/or feathering occurred markedly or A where the straight line was visually clear.

(2) Water Resistance (1)

Printing was conducted by means of the recording apparatus as described above. Upon elapsed time of 1 hour after the printing, the resultant print sample was immersed for 3 seconds in tap water at room temperature and then taken out to be air-dried.

After the drying, the water resistance of the print sample was ranked as A where no change took place on an image, B where no change took place on printed areas, but tailing (reapplication of the dye run out) to blank areas was slightly observed, C where printed areas were blurred and dim, and tailing to blank areas was greatly observed or D where printed areas became illegible.

(3) Water Resistance (2)

A recorded sample obtained by printing by means of the recording apparatus as described above was immersed for 1 minute in tap water at room temperature and then taken out to be air-dried.

A ratio ($D_1/D_0$) of the image density ($D_1$) of the recorded sample after the drying to the image density ($D_0$) of the recorded sample before the immersion in tap water was determined. The greater the ratio, the better the water resistance.

TABLE 1

Examples and Comparative Examples, and evaluation results

| Recording paper | Surface pH of paper | Ink | Print quality | Water resistance (1) | Water resistance (2) (%) | Remarks |
|---|---|---|---|---|---|---|
| A1 | 7.6 | a | A | C | 84 | Comp. Ex. 1 |
| A2 | 7.3 | a | A | B | 94 | Ex. 1 |
| A3 | 6.8 | a | A | A | 98 | Ex. 2 |
| B1 | 7.8 | a | A | C | 82 | Comp. Ex. 2 |
| B2 | 7.4 | a | A | B | 94 | Ex. 3 |
| B3 | 7.0 | a | A | A | 97 | Ex. 4 |
| C1 | 8.2 | a | A | D | 71 | Comp. Ex. 3 |
| C2 | 7.1 | a | A | A | 98 | Ex. 5 |
| C3 | 6.3 | a | A | A | 100 | Ex. 6 |
| A3 | 6.8 | b | A | D | 53 | Comp. Ex. 4 |
| B3 | 7.0 | b | A | D | 66 | Comp. Ex. 5 |
| C3 | 6.3 | b | A | D | 57 | Comp. Ex. 6 |

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording paper comprising a base paper and an ink penetration-retarding agent applied on a surface of the base paper, wherein said recording paper has a water extraction pH of 6 or greater and a surface pH lower than the water extraction pH, and wherein said ink penetration-retarding agent is applied on the surface of the base paper in an amount with respect to said surface of from 0.1 to 3 $g/m^2$.

2. The recording paper according to claim 1, wherein said ink penetration-retarding agent is a material selected from the group consisting of casein, starch, carboxymethyl cellulose, hydroxyethyl cellulose, polyvinyl alcohol, polyvinyl pyrrolidone, sodium polyacrylate, polyacrylamide, styrene-butadiene rubber, acrylic resin, styrene-maleic acid copolymers, styrene-acrylic acid copolymers, silicone oil, paraffin wax and fluorine compounds.

3. The recording paper according to claim 1, which has a water extraction pH of 7 or greater.

4. The recording paper according to claim 1, which has a Stöckigt sizing degree of from 16 to 40 seconds.

5. The recording paper according to claim 1, further comprising a pH adjusting agent on the surface thereof.

6. The recording paper according to claim 5, wherein said pH adjusting agent comprises a substance selected from the group consisting of organic hydrogen carboxylate, hydrogen phosphate and hydrogen carbonate.

7. The recording paper according to claim 6, wherein said organic hydrogen carboxylate is selected from the group consisting of sodium hydrogen phthalate and potassium hydrogen phthalate.

8. A recording paper comprising a base paper and a material selected from the group consisting of casein, starch, carboxymethyl cellulose, hydroxyethyl cellulose, polyvinyl alcohol, polyvinyl pyrrolidone, sodium polyacrylate, polyacrylamide, styrene-butadiene rubber, acrylic resin, styrene-maleic acid copolymers, styrene-acrylic acid copolymers, silicone oil, paraffin wax and fluorine compounds, applied on a surface of the base paper, wherein said recording paper has a water extraction pH of 6 or greater and a surface pH lower than the water extraction pH, and wherein said material is applied on the surface in an amount with respect to said surface of from 0.1 to 3 g/m².

9. The recording paper according to claim 8, which has a water extraction pH of 7 or greater.

10. The recording paper according to claim 8, which has a Stöckigt sizing degree of from 16 to 40 seconds.

11. The recording paper according to claim 8, further comprising a pH adjusting agent on the surface thereof.

12. The recording paper according to claim 11, wherein said pH adjusting agent comprises a substance selected from the group consisting of organic hydrogen carboxylate, hydrogen phosphate and hydrogen carbonate.

13. The recording paper according to claim 12, wherein said organic hydrogen carboxylate is selected from the group consisting of sodium hydrogen phthalate and potassium hydrogen phthalate.

* * * * *

UNITED STATES PATENT AND TRADEMARK OFFICE
CERTIFICATE OF CORRECTION

PATENT NO. : 5,648,164
DATED : July 15, 1997
INVENTOR(S) : Sakaki et al.

It is certified that error appears in the above-identified patent and that said Letters Patent is hereby corrected as shown below:

COLUMN 7:

Table 1,

"Print quality    Water resistance (1)    Water resistance (2) (%)"

should read --

| Evaluation Items | | |
|---|---|---|
| Print quality | Water resistance (1) | Water resistance (2) (%) |

--.

UNITED STATES PATENT AND TRADEMARK OFFICE
CERTIFICATE OF CORRECTION

PATENT NO. : 5,648,164
DATED : July 15, 1997
INVENTOR(S) : Sakaki et al.

It is certified that error appears in the above-identified patent and that said Letters Patent is hereby corrected as shown below:

COLUMN 8:

Table 1,

"Print quality   Water resistance (1)   Water resistance (2)(%)"

should read --

| Evaluation Items | | |
|---|---|---|
| Print quality | Water resistance (1) | Water resistance (2)(%) |

--.

Signed and Sealed this

Twenty-fourth Day of February, 1998

Attest:

BRUCE LEHMAN

Attesting Officer   Commissioner of Patents and Trademarks